United States Patent
Barber

[15] 3,699,399
[45] Oct. 17, 1972

[54] CIRCUITS FOR CONTROLLING SOLENOID ENERGIZATION TO REDUCE HEATING

[72] Inventor: Warren A. Barber, Martinsville, N.J.

[73] Assignee: The Singer Company, New York, N.Y.

[22] Filed: Sept. 30, 1968

[21] Appl. No.: 763,501

[52] U.S. Cl..............317/148.5 B, 317/154, 321/43, 321/47, 317/DIG. 6
[51] Int. Cl...................................................H01h 47/32
[58] Field of Search........317/123 CM, 123 CD, 154, 148.5, 317/156

[56] References Cited

UNITED STATES PATENTS

| | | | |
|---|---|---|---|
| 2,867,754 | 1/1959 | O'Bleness | 317/142 |
| 3,461,375 | 8/1969 | Nestler et al | 317/154 X |

Primary Examiner—William M. Shoop, Jr.
Attorney—Marshall J. Breen and Chester A. Williams, Jr.

[57] ABSTRACT

A circuit is disclosed for initially supplying full-wave rectified alternating current (A.C.) to a solenoid and, after a predetermined time, supplying automatically half-wave rectified A.C. to the solenoid to reduce the heating thereof. Two controlled rectifiers (SCR's) are connected with two diodes in a bridge configuration to supply, when both controlled rectifiers are conducting, a full-wave rectified A.C. to the solenoid. The first SCR is triggereed into conduction during each half cycle by a fixed firing signal. Pulses supplied by the collapsing magnetic field of the solenoid when the first SCR turns off in each cycle are used to charge a capacitor through a resistance connected across the gate and cathode of the second SCR thereby initially triggering the second SCR alternately with the first SCR into conduction in each cycle. However, as the capacitor charge builds up incrementally to maximum, the successive current pulses become smaller until they are insufficient to continue the triggering of the second SCR, which then turns off leaving only the first SCR conducting to supply half-wave rectified A.C. to the solenoid which is sufficient to hold its armature in but insufficient to cause abnormal heating. A diode gate controls the discharge path for the capacitor. This diode is reverse-biased by a circuit which clamps its anode to the most negative excursions of the applied A.C. voltage and prevents discharge of the capacitor until the A.C. voltage is removed, whereupon the capacitor is discharged and is thus reset for the next charging operation initiated when the A.C. is again restored. The first SCR may be replaced by a diode if low-level shut-off of the system is not desired.

14 Claims, 2 Drawing Figures

PATENTED OCT 17 1972　　　　　　　　　　　　3,699,399

INVENTOR.
Warren A. Barber

BY
Marshall J. Breen
ATTORNEY

WITNESS:
Patrick McDonnell

CIRCUITS FOR CONTROLLING SOLENOID ENERGIZATION TO REDUCE HEATING

BACKGROUND OF THE INVENTION

In many applications, it is necessary to supply initially high energization to a solenoid to cause it to accelerate its armature quickly often through a long stroke, to an actuated position. If the solenoid is required to maintain this actuated position for long periods of time, the high initial energization will, if maintained cause excessive heating of the solenoid and the ultimate destruction thereof. Many schemes have been devised for overcoming this difficulty including initial capacitor discharge through the solenoid, voltage switching and phase-controlled rectifiers. All of these schemes have resulted either in rather complex circuitry, mechanical switches of doubtful reliability, or the requirement for large sized energy-storage capacitors which are expensive.

SUMMARY OF THE INVENTION

It is an object of the present invention, therefore, to provide a circuit for controlling the energization of a solenoid, which circuit will overcome the above prior art difficulties and do so without requiring large storage capacitors or increased circuit complexity.

In attaining the objects of this invention, a simple bridge rectifier is used having controlled rectifiers (SCR's) in adjacent arms of the bridge. One SCR is gated to conduct in each cycle or a diode may be used instead. The second SCR is triggered by the pulses resulting from the inductive "kick" of the solenoid itself when the first SCR or diode turns off in each cycle. The amplitude of these pulses is controlled by a capacitor which is incrementally charged thereby. The successive pulses become smaller and cease altogether when the capacitor is fully charged. At some threshold value the second SCR turns off and leaves the first SCR or diode conducting to furnish half-wave rectified A.C. to the solenoid. To reset the circuit, the capacitor must be discharged. This is accomplished by a diode in the discharge path which is reverse-biased by a circuit which clamps its anode to the negative excursions of the A.C. voltage and prevents discharge of the capacitor until the A.C. voltage is removed.

DESCRIPTION OF THE INVENTION

Figure 1:
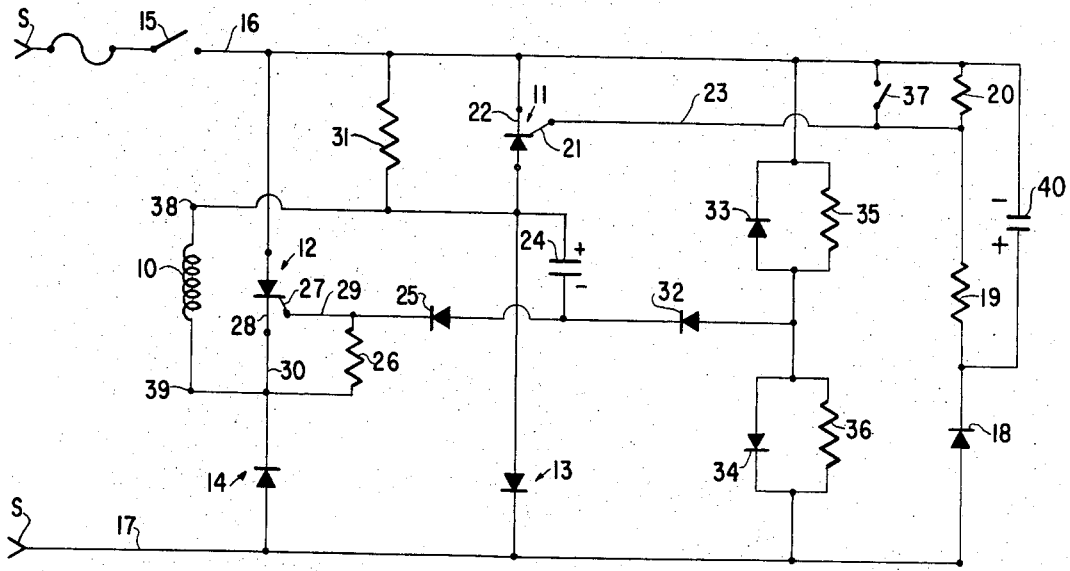
FIG. 1 is a schematic wiring diagram of a circuit illustrating an embodiment of this invention.

Referring now to FIG. 1, a solenoid winding 10 is connected across the output terminals of a full-wave bridge rectifier formed by a first SCR 11, a second SCR 12, a first diode 13 and a second diode 14. A.C. voltage from source S—S is supplied to the input terminals of the bridge rectifier by way of switch 15 and lines 16 and 17.

A fixed triggering circuit for the first SCR 11 is formed by a diode 18 connected in series with resistances 19 and 20 across the lines 16 and 17. Capacitor 40 acts as a filter. The voltage across resistance 20 is applied to the gate 21 and cathode 22 of SCR 11 by lines 23 and 16, respectively.

A triggering circuit for the second SCR 12 is formed by capacitor 24, diode 25 and resistance 26 connected in series across the solenoid winding 10 as shown. As will be explained in detail later, this circuit provides means for charging the capacitor 24 incrementally from the inductive voltage provided by the collapsing field of the solenoid each time SCR 11 turns off in each cycle. For this purpose the resistance 26 is connected across the gate 27 and cathode 28 of SCR 12 by respective lines 29 and 30 and thus, the voltage produced across the resistance 26 by the charging current pulses to capacitor 24 are applied as triggering pulses to SCR 12.

It is important that means be provided to discharge the capacitor 24 selectively only at the end of energization cycle when switch 15 is opened so that the circuit is reset for accurate timing when switch 15 is subsequently closed. This is accomplished by the following circuit: one side of capacitor 24 is connected through resistance 31 to line 16. The other side of capacitor 24 is connected through a discharge diode 32 which has its anode connected to the anodes of diodes 33 and 34 which clamp the anode of diode 32 to the negative excursions of the A.C. voltage when switch 15 is closed. The diodes 33 and 34 have their cathodes connected respectively to lines 16 and 17 and are shunted by resistances 35 and 36 respectively. Switch 37 shunted across resistance 20, is automatically closed responsively to some system malfunction or control function to remove the triggering voltage from SCR 11 and terminate all flow of current to winding 10. SCR 11 can be replaced by a diode and parts 18, 19, 20 and 40 eliminated if no low-level control function is required.

OPERATION

Figure 2:
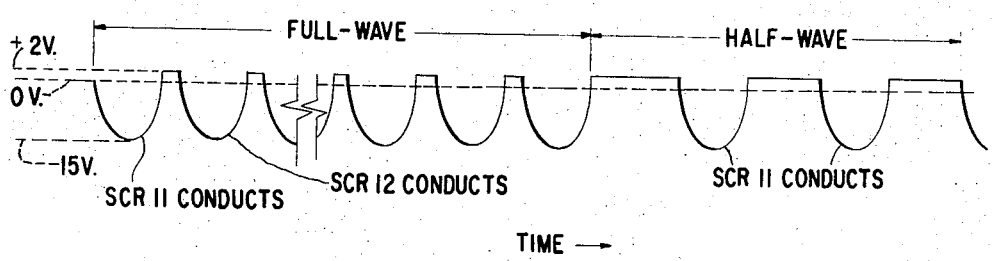
FIG. 2 is a representation of the wave form of the voltage across the solenoid of FIG. 1 with respect to time.

Assuming switch 37 to be open, when switch 15 is closed and when the voltage on line 17 goes positive with respect to that on line 16, a trigger voltage is supplied to gate 21 by current through diode 18 and resistances 19 and 20. SCR 11 will then turn on supplying half-wave current to the solenoid winding 10 through the following path: from line 17 through diode 14, winding 10, SCR 11 to line 16. When the A.C. voltage on line 17 goes through zero towards its negative value, SCR 11 will turn off. The collapsing magnetic field of the winding 10 will produce at terminal 38 a small positive pulse of voltage with respect to its opposite terminal 39. This voltage pulse causes an incremental charging current to flow into capacitor 24 by way of diode 25 and resistance 26 and in so doing supplies a trigger pulse to gate 27 turning on SCR 12 which now has positive anode voltage from line 16. This action is illustrated in FIG. 2, which is the wave form of the voltage at terminal 38 with respect to that at terminal 39, plotted as a function of time. It will be seen that the voltage at terminal 38 does not drop to zero when SCR 11 turns off but actually reverses to a value of some 2 volts positive with respect to terminal 39. It is this positive voltage which supplied the trigger pulse to turn on SCR 12 responsively to the turn off of SCR 11. The voltage levels shown by the dashed lines correspond to 12 volts, RMS value, for the supply S—S.

As the capacitor 24 charges incrementally in each cycle by the above process to the polarity shown in FIG. 1, each successive current pulse will get smaller until, when the capacitor is nearly fully charged, the current pulse is too small to trigger SCR 12 into conduction. Thereafter SCR 11, alone, supplies half-wave rectified current to the solenoid winding 10 as shown in FIG. 2 and will be sufficient to hold the armature in the seated position to which it has been driven by the previous full-wave pickup current. This holding current, however, has approximately half the average value of the pickup current which represents about one quarter the heating value and thus, the solenoid armature can be held in indefinitely without abnormal heating and thus one of the objects of this invention is attained.

The time duration of the initial full-wave current mode can be predetermined to a desired value by suitable choice of the RC value of capacitor 24 and resistance 26 and typically can be made anywhere from one to ten seconds and provides ample time for long-throw armatures to securely seat before changing to the half-wave mode.

To insure repeatable timing accuracy, the capacitor 24 must be discharged rather quickly at the end of the energization cycle when switch 15 is opened. Thus when switch 15 is opened, the capacitor 24 can discharge through the closed path provided by resistance 31, line 16, resistance 35 and discharge diode 32. When switch 15 is closed, however, and lines 16 and 17 are energized with A.C., the diode 32 is reversed biased and no discharge current can flow. This comes about by virtue of the clamping diodes 33 and 34 which clamp the anode of diode 32 to the most negative voltage of the entire circuit as long as A.C. voltage exists on lines 16 and 17. By proper choice of resistances 31 and 35 with respect to capacitor 24, the discharge can be completed in any desired time, say less than one second, so that a new full-wave excitation may be initiated at the operator's command within one second after the de-energization of the solenoid by the opening of switch 15.

It will be understood that, in the circuit of this invention, the capacitor 24 need not be large because it is required only to store the small energy related to the small trigger pulses necessary to trigger SCR 12. This is a distinct advantage over the prior art systems which require large and expensive energy storage capacitors to furnish the high initial discharge current directly to the solenoid winding. The low-level shut-off control circuit represented by switch 37 (if used) will remove solenoid energization in either the half-wave or full-wave mode.

The circuit of this invention utilizes the intrinsic "turn-off" advantages of SCR's in simple A.C. circuitry and avoids the need for any expensive high energy storage devices.

Having thus set forth the nature of this invention, what I claim herein is:

1. A circuit for controlling the energization of a solenoid winding from an A.C. voltage source comprising: a controlled rectifier and a first diode connected in series and forming a path for current flow to the winding during successively similar half cycles of the A.C. voltage, second and third diodes connected in series and forming a path for current flow to the winding during the successively opposite half cycles of the A.C. voltage, means responsive to the periodic turn-off of said second and third diodes providing periodic triggering of the controlled rectifier during said similar half cycles and timing means for automatically terminating the further triggering of the controlled rectifier after a predetermined time following the initial conduction of the second and third diodes.

2. The circuit according to claim 1 wherein the timing means includes a capacitor, a resistance and a diode connected in series across said winding for incrementally charging said capacitor from the reactive voltage pulses induced in the winding following turn-off of the second and third diodes in each cycle.

3. The circuit according to claim 2 wherein a discharge path for said capacitor includes a discharge diode which is normally reverse-biased and which conducts to close the discharge path only when the A.C. voltage is removed.

4. The circuit according to claim 3 wherein the reverse bias is obtained by clamping diodes which clamp the anode of the discharge diode to the most negative side of the A.C. voltage.

5. A circuit for controlling the energization of a solenoid winding from an A.C. voltage source comprising a pair of controlled rectifiers and a pair of diodes arranged in a full wave bridge configuration having input terminals adapted to be connected to said A.C. voltage source and output terminals connected to said winding, means providing fixed triggering of a first one of said controlled rectifiers into conduction during each positive half-wave cycle of the A.C. voltage, means including a capacitor, a resistance and a diode connected in series across said winding for incrementally charging said capacitor from the reactive voltage pulses induced in the winding responsively to the turn off of the first controlled rectifier in each cycle, means responsive to said charging pulses for triggering said second controlled rectifier into conduction during each negative half-cycle of the A.C. voltage to provide full-wave energization of the winding and means responsively to the near attainment of a full charge on said capacitor for terminating the charging pulses and preventing further turn on of said second controlled rectifier to provide half-wave energization of the winding by said first controlled rectifier after a time interval related to the time required to charge said capacitor.

6. The circuit according to claim 5 wherein means for discontinuing the further triggering of the first controlled rectifier is rendered effective responsively to manual or automatic command whereby all current flow to the winding is terminated.

7. The circuit according to claim 5 wherein means for discharging the capacitor is rendered effective responsively to the removal of the A.C. voltage from the circuit.

8. A circuit arrangement for producing a stepped load current, comprising:
   an alternating-current source;
   a load to be energized from said source;
   a coupling network inserted between said source and said load, said network including a first branch and a second branch;
   electronic valve means in said second branch provided with a control electrode for selectively blocking and unblocking the flow of current therethrough;

and biasing means for said electrode connected, upon closure of a circuit from said source via said network to said load, to be progressively charged until said valve means is switched from an unblocked condition to a blocked condition in which load current passes only through said first branch, thereby varying the magnitude of said load current from a relatively high starting value to a relatively low steady-rate value.

9. A circuit arrangement as defined in claim 8 wherein said coupling network is a full-wave rectifier with a first pair of arms constituting said first branch and a second pair of arms constituting said second branch.

10. A circuit arrangement as defined in claim 9 wherein said electronic valve means comprises a semiconductor element provided with two main electrodes in one of the arms of said second branch and with a control electrode, said biasing means including a capacitance and a charging resistance therefor serially connected across said main electrode and forming a junction connected to said control electrode.

11. A circuit arrangement as defined in claim 10 wherein said semiconductor element is a controlled rectifier with a cathode and an anode representing said main electrodes and with a gate representing said control electrode.

12. A circuit arrangement as defined in claim 11 wherein said charging resistance includes the cathode/gate resistance of said controlled rectifier.

13. A circuit arrangement as defined in claim 12 wherein said biasing means further includes a diode in series with said capacitance and poled in the forward direction of gate-current flow.

14. A circuit arrangement as defined in claim 9 wherein said load is predominantly inductive, said bridge including a pair of diodes forming a closed loop with said load.

* * * * *